March 21, 1967     M. E. CLYNES     3,310,049
ULTRASONIC CARDIAC VOLUME MEASUREMENTS
Filed Sept. 17, 1963
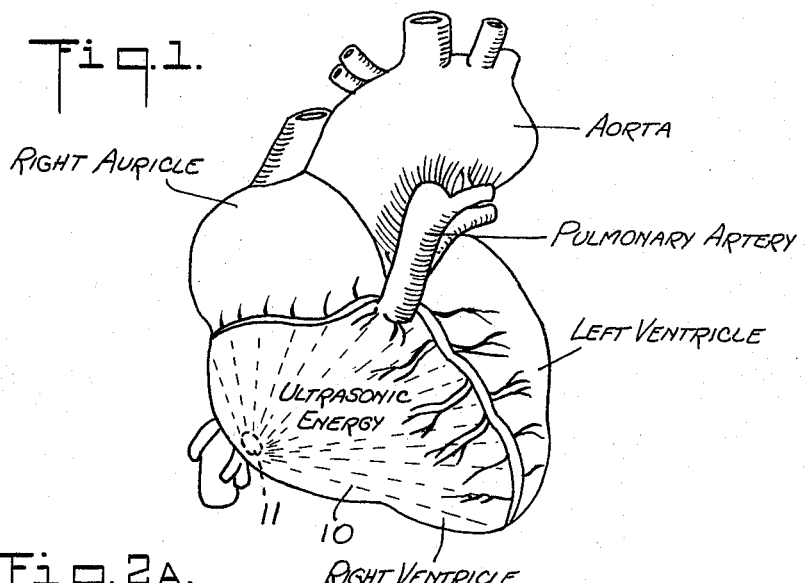
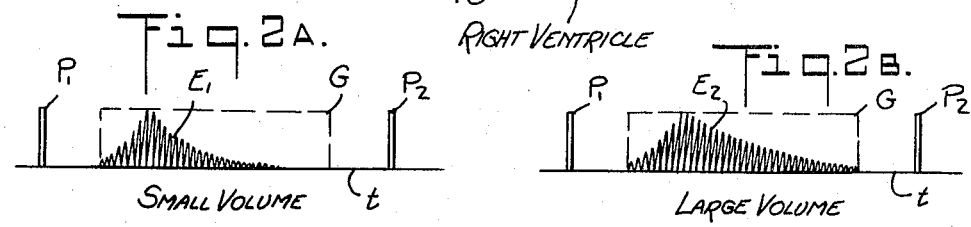
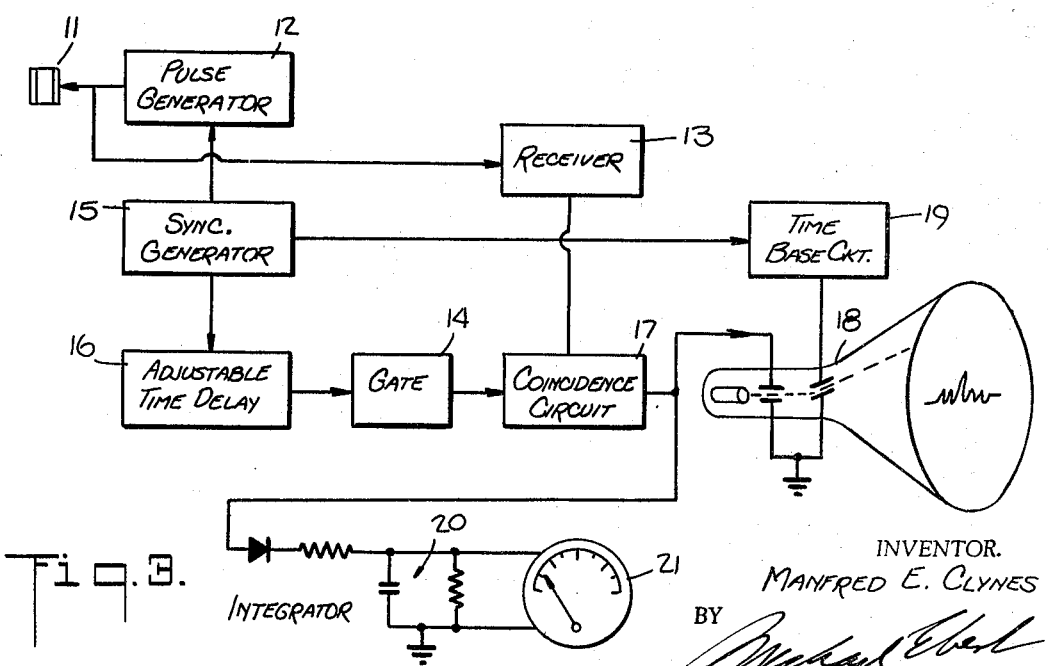
INVENTOR.
MANFRED E. CLYNES
BY
ATTORNEY

United States Patent Office 3,310,049
Patented Mar. 21, 1967

---

3,310,049
ULTRASONIC CARDIAC VOLUME MEASUREMENTS
Manfred E. Clynes, Palisades, N.Y., assignor to Air-Shields, Inc., Hatboro, Pa., a corporation of Delaware
Filed Sept. 17, 1963, Ser. No. 309,443
6 Claims. (Cl. 128—2.05)

This invention relates generally to ultrasonic medical instruments, and more particularly to an ultrasonic method and apparatus for measuring the instantaneous volume of the chambers of the heart, as well as the instantaneous cross section of major vessels.

The heart, which is a hollow organ composed of muscle, is an integral part of the circulatory system, blood circulation being maintained by alternate contraction and dilation. The human heart is divided into four major chambers, valves being disposed between the right auricle and right ventricle, and similar valves being placed between the left auricle and left ventricle. Also, there are valves between the ventricles and the respective arteries leading from them. As the heart functions, blood entering the right auricle comes from the body and passes on into the right ventricle to be pumped to the lungs. The blood returns by the pulmonary veins to the left auricle, then enters the left ventricle from which chamber it is pumped into the body.

One cardiac problem of growing interest in medical research and in clinical studies is the work output or capacity of the heart. One known technique for this purpose is the dye dilution method, but this method is difficult to carry out and is time consuming.

Accordingly, it is the principal object of this invention to provide an ultrasonic technique for continuously measuring the dynamic volume changes of the respective chambers of the heart or for measuring the instantaneous cross section of major vessels.

More specifically, it is an object of the invention to provide a pulse-echo ultrasonic instrument for measuring the volume of a heart chamber by irradiating the interior of the chamber with periodic ultrasonic pulses, detecting the pulse energy reflected from the walls of the chamber during a predetermined interval between successive transmitted pulses, and integrating the reflected energy to determine the mean density thereof, thereby to obtain an index of the volume of the reflecting chamber.

Also an object of the invention is to provide a compact, low-cost ultrasonic instrument for continuously measuring the volume of the heart, which instrument is of simple, efficient and reliable design.

For a better understanding of the invention, as well as other objects and further features thereof, reference is made to the following detailed description to be read in conjunction with the accompanying drawing, wherein:

FIG. 1 is a schematic diagram of the heart, illustrating the placement of an ultrasonic transducer to carry out volume measurements in accordance with the invention;

FIGS. 2A and B are graphs showing the pulse echo received from chambers of different volume between successive transmitted pulses; and FIG. 3 is a block diagram of a preferred embodiment of an ultrasonic instrument in accordance with the invention.

Referring now to FIG. 1, there is shown a human heart comprising four chambers including the right ventricle 10. The purpose of the present invention is to measure the volume of any of the four chambers, but since the technique is the same for every chamber, the invention will be illustrated only as it applies to the measurement of the right ventricle 10.

In accordance with the invention, the ventricle is irradiated with ultrasonic pulse energy at a constant energy rate per second. This is accomplished by inserting a minute ultrasonic transducer 11 in the chamber against the wall thereof. The transducer may be inserted through an artery by means of a catheter in accordance with well-known medical techniques.

The transducer 11 is excited to emit ultrasonic pulses at a constant repetition rate, each pulse being of a fixed height and width. In practice, the repetition rate may be in the order of 2000 per second, the pulse duration being in the order of microseconds, whereby a relatively long interval exists between successive pulses. For example, the pulses may be derived from a carrier generator whose frequency is in the range of 1 to 10 megacycles, with a pulse duration of two microseconds, so that each pulse contains only a few cycles of the carrier frequency.

The transducer is designed so that the radiation therefrom is multi-directional, hence the pulsatory energy is emitted in all directions within the heart chamber and is reflected from the walls thereof. The reflected echoes either return directly to the transducer, or return after reverberation within the chamber.

Transducer 11 is formed of a material such as barium titanate, which behaves as an electrostrictive piezoelectric element adapted to convert radio frequency waves into ultrasonic energy, or to convert such energy into radio-frequency waves. Thus the transducer is adapted to act both as an ultrasonic transmitter and a detecting element. In some instances it may be desirable to have a separate receiving transducer.

In FIG. 2, which illustrates the transducer function, the pulses $P_1$ and $P_2$ represent two successive ultrasonic pulses generated by the transducer, while the spaces between these pulses represent the interval during which the transducer detects reflected ultrasonic energy. Since the paths between the transducer and various points along the chamber wall have different lengths, the echoes from the various reflecting points will arrive at different moments in time during the interval between pulses $P_1$, $P_2$. Moreover, since pulse energy will also reverberate within the chamber, energy will also return to the transducer at different times, depending on the geometry of the reverberating paths. The amplitude of echoes will vary as a function of the distance traveled and the character of the reflecting surface.

Thus, as shown in FIG. 2A, in the interval between pulses $P_1$ and $P_2$, there will appear an echo response $E_1$ whose complex wave form will depend on the parameters of the irradiated chamber. Obviously, for chambers of different dimensions, the character of the total received echoes will be different, for the character of the response is a function of the chamber dimensions. The response, as will be evident in FIG. 2A, has a build-up period and a decay period. In accordance with the invention, a predetermined section of the response $E_1$ is extracted during a gating period G, and the energy received during this period is integrated to provide a value representing the mean density or average thereof. This value, which is a function of the volume of the chamber, provides volume reading.

In FIG. 2B, the response $E_2$ is representative of a larger volume than the response $E_1$ in FIG. 2A. The gate width is variable and the mean energy may be measured over the entire period if desired. That is, the gate may be opened as wide as the pulse period. The gate width is generally set to obtain the best linearity.

The manner in which this measurement is carried out is illustrated in FIG. 3. Transducer 11 is excited by a pulse generator 12 operating at the desired carrier frequency, the generator being coupled directly to the transducer. Echo pulse detected by the transducer are applied to a video amplifier 13 to produce output energy whose magnitude is proportional to the amplitude of the echo pulses. In a sense, the sonic response is similar to that received within an acoustic chamber whose walls partially absorb and also reflect the radiated pulses.

In order to select the response during the period G to the exclusion of all other echoes, there is provided an electronic gate 14 which may be of the vacuum-tube or diode type and acts effectively as a switch which is actuated and remains open to pass echo pulses for a limited period. The gate, for example, may be an electronic switch which is normally biased to cut-off and is rendered conductive by the application of a square wave from a one-cycle multivibrator, the width of the square wave determining the open time of the gate. The gate is opened by the application of a trigger pulse to the multivibrator, this trigger pulse being derived from a sync generator 15 through an adjustable time delay circuit 16. The operation of pulse generator 12 is also controlled by the sync generator 15.

Thus when an ultrasonic pulse is transmitted, a trigger pulse is derived simultaneously from sync generator 15, which reappears after a predetermined time interval in the output of the delay circuit 16, this pulse initiating the operation of the gate 14. By varying the time delay introduced by delay circuit 16, a particular period of response in the interval between transmitted pulses $P_1$ and $P_2$ may be selected for examination, and all other echoes rejected. In effect, therefore, the gate position may be shifted along the time base line $t$, as shown in FIGS. 2A and B, relative to the point of origin representing the instant of transmission.

The output of the video amplifier 13 is applied to a coincidence circuit 17 of standard design concurrently with the output of the gate 14. This circuit produces an output only when echo responses fall within the gating period, which in the example shown in FIGS. 2A and B, occurs only within the period G.

The output of the coincidence circuit 17 is applied to the vertical deflection electrodes or coils of a cathode-ray oscilloscope 18, whereas a time base sawtooth generator 19, whose operation is synchronized by sync generator 15, is coupled to the horizontal deflection electrodes to produce a scanning sweep which is initiated simultaneously with the transmissioin of an ultrasonic pulse.

Thus as the electron beam is deflected along the base line, it is also deflected vertically by the echo response to produce a visual pattern of the response at a position along the base line relative to the starting point, which depends on the time position of the gating period G. The entire response may be scanned by shifting the time position of the gate period through adjustment of delay circuit 16. The function of the ociloscope is to enable the operator to view the wave pattern of the response to determine which section thereof is to be extracted by the gate.

The echo response derived during the gating period is taken from the output of the coincidence circuit and integrated in an integrating circuit 20 whose output value represents the means density of the ultrasonic energy response during the gating interval. This output value is applied to an indicator 21, which in practice may be a vacuum-tube voltmeter, the indicator being calibrated in terms of chamber volume. To calibrate the indicator, an animal chamber which is inflatable to different dimensions, may be used to determine the echo response throughout a range of different volume. Alternatively, a standard dye dilution method may be used for purposes of calibration.

In measuring the cross section of large vessels, such as a section of aorta, a cylindrical transducer may be placed parallel to the aorta and the method disclosed above may be used to carry out the measurement. The reading is now that of the instanteous cross section rather than volume. Such readings are useful for pulsation and obstruction testing.

While there have been shown and described a preferred method and apparatus for ultrasonic cardiac volume measurement according to the invention, it will be appreciated that many changes and modifications may be made therein without, however, departing from the essential spirit of the invention. Thus it is possible to use continuous wave ultrasonic energy to irradiate the chamber rather than pulse energy, the mean energy level of response being detected by a separate receiving transducer, which level varies with the instantaneous volume. Instead of a separate receiver, the loading on the transmitting transducer may be measured, this loading ranging with instantaneous volume.

What is claimed is:

1. The method of measuring the instantaneous volume of an organic chamber, comprising the steps of irradiating the chamber with periodic pulses of ultrasonic energy in multiple directions angularly displaced from each other to cause said pulses to strike the walls of said chamber at various points thereon, detecting during the interval between successive pulses ultrasonic energy reflected from the walls of said chamber, and integrating said detected energy to produce a value which is a function of the instantaneous volume of said chamber.

2. The method of measuring the instantaneous volume of a cardiac chamber, comprising the steps of inserting an ultrasonic transducer in said chamber, exciting said transducer to transmit within said chamber periodic pulses of ultrasonic energy which are reflected from the walls thereof, said transducer radiating pulses in multiple directions angularly displaced from each other to cause said pulses to strike the walls of said chamber at various points thereon, detecting the reflected energy in the interval between said pulses, and integrating said detected energy to produce a value which is a function of the instantaneous volume of said chamber.

3. The method of measuring the instantaneous volume of a cardiac chamber, comprising the steps of inserting an ultrasonic transducer in said chamber, applying periodic high-frequency waves to said transducer to produce periodic ultrasonic pulses of microsecond duration at a repetition rate of about 2000 pulses per second, said transducer radiating pulses in multiple directions angularly displaced from each other to cause said pulses to strike the walls of said chamber at various points thereon, which ultrasonic pulses are reflected from the walls of said chamber, deriving from the transducer in the interval between said pulses the energy reflected from said walls, integrating the reflected energy to determine the means density thereof, and indicating said integrated value to provide a reading which is a function of the instantaneous volume of said chamber.

4. An instrument for determining the instantaneous volume of a cardiac chamber, comprising a transducer insertable in said chamber to irradiate same with ultrasonic energy in multiple directions angularly displaced from each other to cause said pulses to strike the walls of said chamber at various points thereon, generator means coupled to said transducer to excite same to transmit within said chamber ultrasonic pulses of relatively brief duration, receiver means coupled to said transducer to derive therefrom the echo response developed in the interval between said transmitted pulses, an integrator coupled to said receiver means to produce a value dependent upon the mean density of said response, and indicator means coupled to said integrator to provide a reading which is a function of the instantaneous volume of said chamber.

5. An instrument as set forth in claim 4, further including gating means to extract from said response the wave developed during a predetermined period within said interval.

6. An instrument as set forth in claim 4, wherein said pulses are of microsecond duration and are transmitted at a rate of about between 500 to 2500 per second.

References Cited by the Examiner

"Diagnostic Use of Ultrasound," pp. 248–264, November 1956, J. J. Wild et al. in The British Journal of Physical Medicine.

"The Application of Ultrasonics," pp. 263–279, August 1958, G. Baum et al. in A.M.A. Archives of Ophth.

"Transmission of Ultrasound," pp. 141–146, September 1959, H. D. Crawford et al. in IRE Transactions on Med. Elect.

"Ultrasonics in Ocular Diagnosis," pp. 488–492, March 1956, G. H. Mundt et al. in Am. J. Ophth.

"Use of High-Frequency Ultrasonic Waves," pp. 655–657, March 24, 1951, J. J. Wild et al. in The Lancet.

ROBERT E. MORGAN, *Acting Primary Examiner.*

SIMON BRODER, *Examiner.*